June 27, 1972 A. T. BUTTRISS 3,672,738

CARTRIDGE DEVICE FOR FASTENERS AND THE LIKE

Filed Feb. 9, 1970 3 Sheets-Sheet 1

INVENTOR
ALBERT T. BUTTRISS
BY

*Teare, Teare & Sammon*
ATTORNEYS

INVENTOR
ALBERT T. BUTTRISS
BY
Teare, Teare & Sammon
ATTORNEYS

United States Patent Office 3,672,738
Patented June 27, 1972

3,672,738
CARTRIDGE DEVICE FOR FASTENERS
AND THE LIKE
Albert T. Buttriss, Westlake, Ohio, assignor to Eaton
Corporation, Cleveland, Ohio
Filed Feb. 9, 1970, Ser. No. 9,834
Int. Cl. A47f 1/00
U.S. Cl. 312—71                                12 Claims

ABSTRACT OF THE DISCLOSURE

A cartridge device for mounting a plurality of fasteners for use in a fastener driving apparatus including a hollow body member adapted to receive a column of fasteners having a forward and rearward end. A plunger member disposed interiorly of the body member initially adjacent the rearward end and a closure member disposed over the rearward end of the body member. The closure member having aperture means to receive fluid under pressure therethrough for moving the plunger member interiorly of the body member to discharge fasteners from the forward end of the body member.

BACKGROUND OF THE INVENTION

The present invention relates to fastener devices, and more particularly relates to a replaceable and/or disposable cartridge device for use in automatic fastener driving apparatus. The cartridge device of the present invention is particularly adapted for use in pneumatically operated fastener driving tools of the type described in the co-pending U.S. patent application Ser. No. 76,743 filed Sept. 30, 1970, to Albert T. Buttriss.

Heretofore, due to the variety of different applications in which fasteners are commonly employed, a number of different sizes and types of fasteners have been developed and, in consequence, many types of fastener driving tools have been proposed for driving and applying fasteners. Accordingly, producers and suppliers of driving tools and fasteners therefor have generally been required to maintain all or many of these different types of tools on hand in addition to large inventories of spare parts for each type of tool. These prior tools have been been employed for driving and applying various types of fasteners, such as common nails, wire staples, tacks and the like, but problems have been encountered with such applications because of the inability to maintain such fasteners in accurately spaced orientation during generally continuous high speed operation. Though not satisfactory for a number of applications, efforts have been made to obviate such problems by altering the shape of the fastener, by modifications in the driving structure and magazines of the tools or by the employment of flexible strips, such as of plastic, so as to join the heads and/or shanks of the fasteners in a continuous assemblage. Such arrangements are not satisfactory expedients due, in part, to the cost requirements of such arrangements and the difficulty in maintaining proper orientation of the parts and/or removal of the parts from the particular type of fastener driving tool.

SUMMARY OF THE INVENTION

A cartridge device for mounting a plurality of fasteners comprising, an elongated hollow body member adapted to receive a plurality of fasteners therein, said body member including a forward end and a rearward end with a plunger means disposed interiorly of the body member adatped for movement interiorly of the body member in a direction from the rearward and toward the forward end, closure means disposed over the rearward end of said body member, and said closure means having aperture means adapted to receive fluid under pressure therethrough for moving said plunger means in a direction from said rearward end toward said forward end thereby to discharge said fasteners from the forward end of said body member. The body member further includes a cap means removably mounted adjacent the forward end to prevent removal of fasteners from said body member in the inactive condition of said device. The plunger means and closure means are constructed and arranged for operative coaction with components of a fastener driving apparatus for driving said fasteners under fluid pressure from said device and for preventing discharge of fasteners in an inverted position from the normal position thereof during operation of the device.

As will be apparent from the following description and accompanying drawings, the present invention provides a novel cartridge device for mounting a plurality of fasteners in stacked, side-by-side relation for quick and easy assembly and removal with respect to the magazine structure of an auomatic fastener driving apparatus, such as of the pneumatic type. The cartridge device of the invention is of a simple, yet rugged basic construction by which a variety of different types and sizes of fasteners can be held in stacked relation for ready attachment to a fastener driving tool. This enables a manufacturer to make a single basic tool structure which is readily adaptable for use with a large number of different types of fasteners and consequently reduces the inventory requirements and costs of the tools. More specifically, the cartridge device of the present invention is constructed so as to be quickly removed from the fastener driving tool and/or is readily disposable with minimum expense in order to accommodate different sizes and types of fasteners. The cartridge device of the invention is constructed and arranged to be expeditiously filled with fasteners and quickly loaded into the magazine structure of a fastener driving tool by simple manual manipulation and with minimum possible error on the part of the user. The cartridge device of the invention eliminates loose parts handling on the line and prevents shortages due to an excess of wasted parts. In addition, the cartridge device can be readily pre-filled with fasteners within a very short time period so that the device can be stored and/or loaded into the magazine structure of the driving tool, as desired. Furthermore, the cartridge devices of the invention is constructed and arranged so as to maintain the fasteners in generally parallel side-by-side relationship thereby to maintain the fasteners in proper orientation for accurate discharge into the ram guide structure for application by the fastener driving tool. The cartridge device is further provided with a fail-safe construction which cooperates with components of the fastener driving tool to ensure that the cartridge device, and hence, the fasteners are properly positioned for ultimate application to a work piece, such as a panel or the like.

DESCRIPTION OF THE PREFERRED EMBODIMENTS

Figure 1:
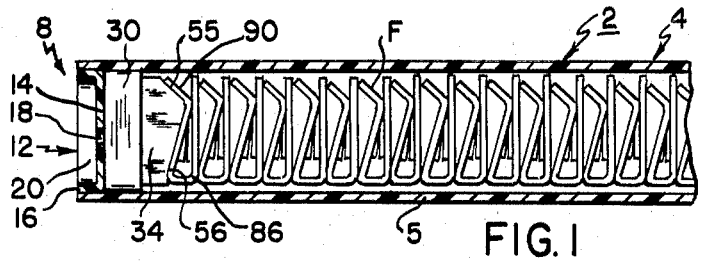
FIG. 1 is a fragmentary, vertical section view of the cartridge device made in accordance with the present invention for mounting a plurality of fasteners therein.
Figure 1:
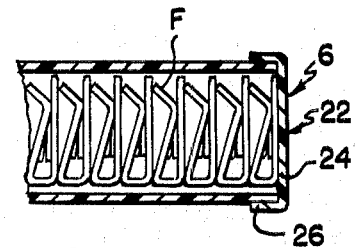
Figure 8:
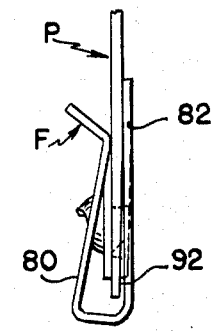
FIG. 8 is a fragmentary view showing the fastener of FIGS. 6 and 7 in the installed position with a support panel.
Figure 13:
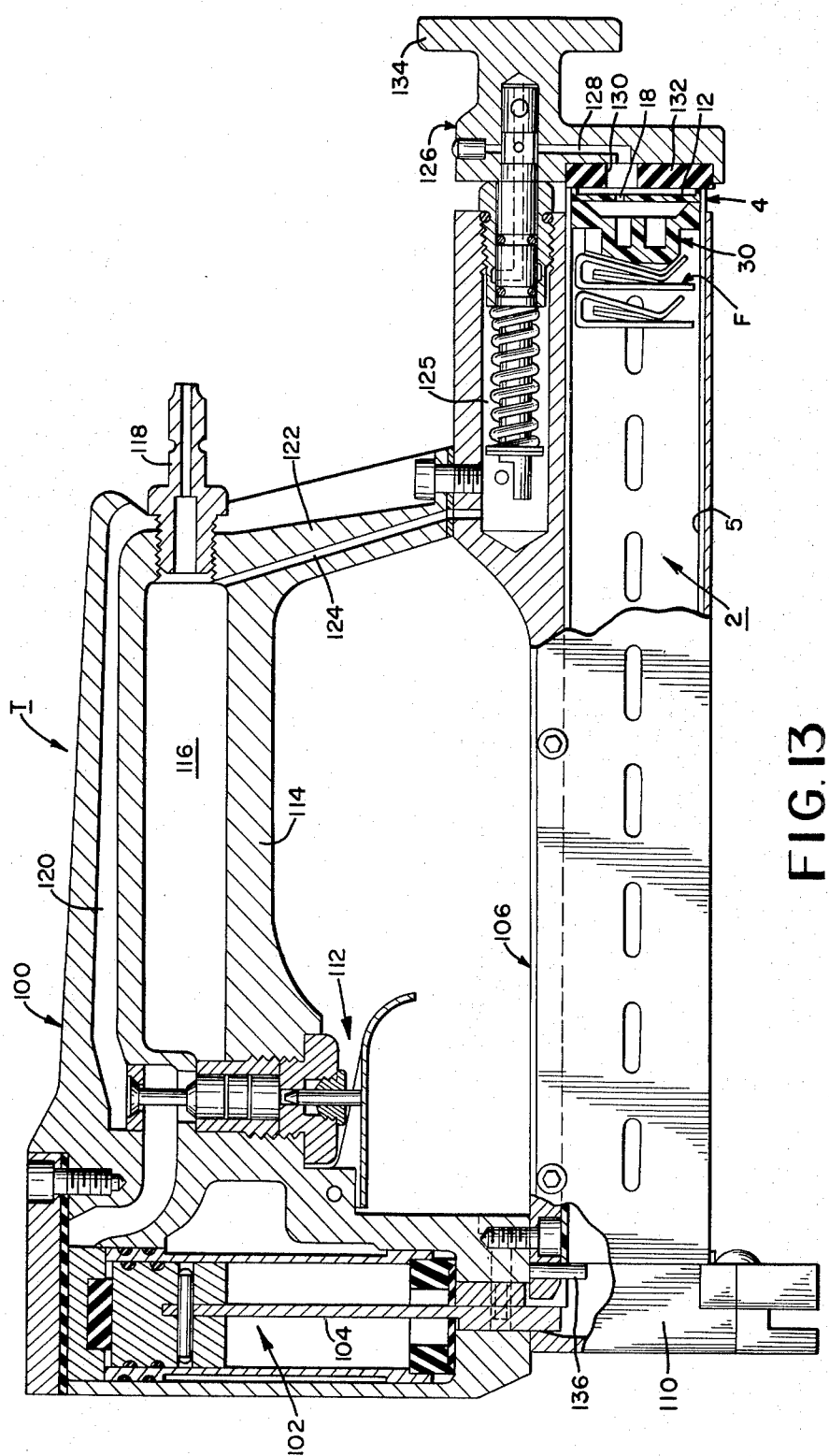
FIG. 13 is a side elevation view partly in section, and partially broken away illustrating the cartridge device of the invention mounted with a fastener driving apparatus.

Referring again to the drawings and in particular to FIGS. 1 and 13 thereof, there is illustrated the cartridge device, designated generally at 2, mounting a plurality of fasteners F which may be loaded into the magazine structure of a fastener driving tool T, as shown in FIG. 13. In the assembled position, the tool T is actuated by the operator to automatically and precisely apply the fasteners F to a work piece P, such as a panel or the like as shown in FIG. 8.

Figure 2:
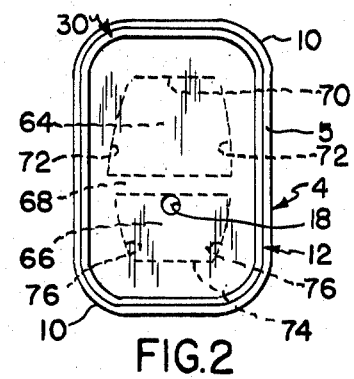
FIG. 2 is an end view, on an enlarged scale, looking from the left hand side of FIG. 1.

In the invention, the cartridge device 2 includes an elongated, hollow body member 4 having a forward end 6 and a rearward end 8. The body member 4 is preferably of a tube-like construction which is of an endless cross-section which is preferably polygonal, such as rectangular or the like. As seen in FIG. 2, the body 4 is generally rectangular in shape having rounded corners, as at 10, to provide a durable construction which is easily handled. Preferably, the body member 4 is made of a resilient polymeric material such as butyrate or the like. In the invention, it is preferred that the body member be made of a clear or transparent material to facilitate visual observation of the fasteners mounted therein. In addition, it is preferred that the endless wall 5 of the body member be sufficiently thin so as to provide good flexibility, such as about .015 inch, for the purposes hereinafter described.

As best seen in FIGS. 1 and 2, the rearward end 8 of the body member 4 is provided with a closure means 12 so as to provide a seat-like structure for coacting engagement with the fluid pressure input structure of the fastener driving tool T. In the form shown, the closure means 12 includes a complementarily shaped disc having a base 14 having an endless outwardly extending peripheral flange 16 which together define a generally U-shaped structure, in side elevation, as seen in FIG. 1. The disc may be attached and/or integrally joined to the confronting interior surface of the wall 5 of the body member by any suitable means, such as cementing, heat sealing, molding or the like.

Preferably, the base 14 is provided with an aperture, as at 18, to enable fluid under pressure to be transmitted through the closure means 12. The aperture 12 is positioned inwardly of the flange 16 and is preferably disposed along a line containing the vertical axis of the body member 4 and slightly below the geometric center of the base 14. The base 14 and flange 16 together define a recess-like opening 20 which provides a pocket-like construction for coacting sealing engagement with the fluid inlet structure of the driving tool T.

The other or forward end 6 of the body member 4 is adapted to receive a cap means 22 which acts to prevent removal of fasteners from the interior of the body member 4 when the cartridge device 2 is not in use and/or in the stored condition. The cap means 22, in the form shown, includes a generally flat base 24 having an integral peripheral endless flange 26 which corresponds in shape to that of the transverse shape of the body member 4. Preferably, the cap means 22 is easily snapped over the confronting peripheral surface of the body member 4 and held in secured position via the flange 26. By this arrangement, the cap means 22 may be readily removed prior to loading the cartridge device 2 into the magazine structure of the driving tool T. In the form shown, the closure means 12 and cap means 22 are preferably made of a resilient polymeric material which may be the same as that employed for use in making the body member 4.

Now in accordance with the invention, a plunger means 30 is disposed interiorly within the body member 4 for driving the fasteners F generally axially through the body member in a direction from the rearward end 8 toward the forward end 6 for ultimate discharge therefrom into the ram guide structure of the driving tool T. In the form shown, the plunger means 30 includes a base 32 and a support-like seat 34 which together define a plug-like construction for fluid coacting driving engagement with respect to the fasteners F. The base 32 is of a generally complementary shaped construction with respect to the transverse shape of the body member 4 and includes an endless resilient skirt-like flange 36. The flange 36 includes an opposed pair of side walls 38 and an opposed pair of end walls 40. The walls 38 and 40 are inclined inwardly and outwardly in generally convergent relation in a direction toward said seat member 34. By this arrangement, the flange 36 has a minimum wall thickness adjacent its outermost marginal edge with the wall progressively increasing in thickness in a direction toward said seat member 34 so as to provide a cup-like structure for receiving fluid under pressure and so as to enable the flange 36 to be resiliently biased outwardly into a wiping-like fluid sealing engagement with the confronting interior surfaces of the body member 4. The side walls 38 and 40 together define an opening, as at 42, disposed within the confines of the flange 36. The flange 36 is of a polygonal, such as rectangular, configuration, and is also provided with rounded corners, as at 44 (FIG. 4) so as to slide smoothly within the complementary-shaped body member 4. Moreover, the periphery of the flange 36 is dimensioned so as to be frictionally slidable within the body member 4 and hence, is dimensioned so as to be slightly less than the corresponding transverse dimensions of the body member 4.

Figure 3:
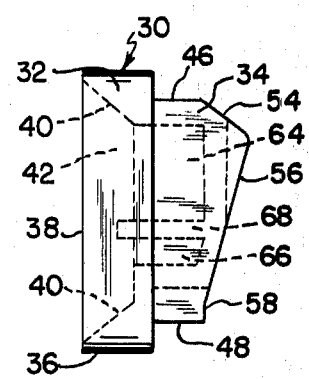
FIG. 3 is a side elevation view, on an enlarged scale, of the plunger member removed from the cartridge device.
Figure 5:
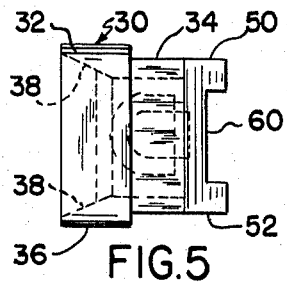
FIG. 5 is a top plan view of the plunger member shown in FIG. 3.
Figure 4:
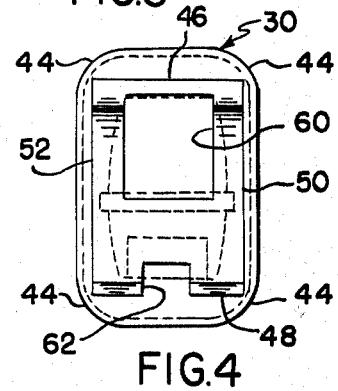
FIG. 4 is a side elevation view looking from the right hand side of FIG. 3.

As best seen in FIGS. 3–5, the seat member 34 which projects outwardly from the base 32 is preferably of a hollow construction disposed generally centrally of the base 32. As shown, the member 34 includes a pair of oppositely disposed, parallel end walls 46 and 48 and a pair of oppositely disposed, parallel side walls 50 and 52 which define a polygonal, such as rectangular, configuration in front elevation, as seen in FIG. 4. The member 34 is provided with a forwardly disposed ramp-like construction for mounting a respective one of the fasteners F in laterally spaced relation with respect to the base 32. This ramp-like construction comprises an angularly inclined face which includes an upper downwardly and outwardly inclined surface 54 which commences at the upper end wall 46, an elongated downwardly and inwardly inclined surface 56 which commences at the surface 54 and which merges into a generally vertically extending surface 58 which, in turn, merges with the lower end wall 48. The surfaces 54 and 56 are provided with a generally polygonal, such as rectangular, cut-out portion 60 which provides a clearance area for inwardly projecting stud engaging members on a respective one of the fasteners F. The surfaces 56 and 58 and the lower end wall 48 are provided with a cut-out slot 62 having a depth so as to terminate at the confronting surface of the base 32 and which opens on to the surfaces 56, 58 and the lower end wall 48. The slot 62 provides a clearance area for an abutment structure on the fastener driving tool T to prevent the user from ejecting fasteners from the tool with the closed end of the fastener facing the panel P, as will be described hereinafter.

In the form shown, the hollow construction of the seat member 34 is preferably provided by a pair of cavities 64 and 66 separated by a transverse web member 68. As shown, the upper cavity 64 (FIG. 2) includes an upper generally horizontally extending wall 70 and a pair of oppositely disposed arcuate walls 72 which merge with the web member 68. Similarly, the lower cavity 66 includes a lower generally horizontally extending wall 74 and a pair of oppositely disposed arcuate walls 76 which merge with the other side of the web member 68. The cavities 64 and 66 communicate with the opening 42 defined by the endless flange 36 and the web member 68 acts to give increased strength to the generally resilient construction of the base 32 and seat member 34. By this arrangement, the cavities 64 and 66 together with the opening 42 provide a pocket-like construction adapted to receive fluid pressure for resiliently biasing the flange 36 into outward coacting fluid sealing, yet sliding engagement with the confronting interior surface of the body member 4 during use of the fastener driving tool T.

In the form shown, the plunger means 30 including the base 32 and seat member 34 is preferably made from a resilient polymeric material, such as polyvinyl chloride or the like. It is to be understood that though the seat member 34 has been described with reference to a particular construction, such construction may be modified dependent upon the particular size and/or shape of the fastener to be employed with the fastener driving tool T, as desired.

Figure 6:
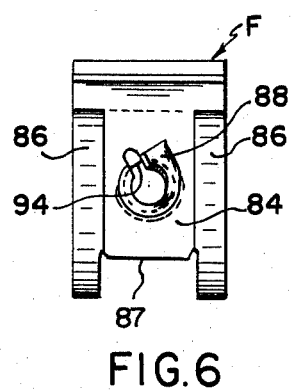
FIG. 6 is a top plan view of one type of fastener which may be employed with the cartridge device of the invention.
Figure 7:
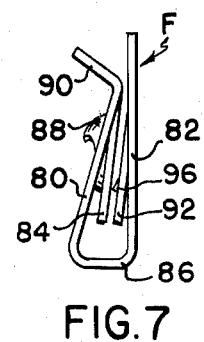
FIG. 7 is a side elevation view of the fastener shown in FIG. 6.

As best seen in FIGS. 6–8, there is illustrated one form of fastener F which may be employed with the cartridge device 2 of the present invention. As shown, the fastener F may be constructed from a strip of sheet metal and has a U-shaped configuration defined by a body portion 80 and a return bent body portion 82 which are adapted to receive therebetween the support panel P, as seen in FIG. 8. The body portion 80 is provided with a pair of longitudinal slits providing a spring arm 84 between side portions 86 which define the generally U-shaped formation of the fastener. The spring arm 84 is provided with a thread opening defining means for threadably engaging a bolt, screw or the like. Preferably, such opening is defined by a raised crimped construction in the form of a helix 88 which corresponds substantially to the root of the bolt or screw for threadably engaging the thread thereof. The body portion 80 is preferably provided with an outwardly flared lip 90 to facilitate initial application of the fastener over the edge of the panel P. The other body portion 82 of the fastener is defined by a return bent end of the blank and is provided with a cut-out area defining a spring arm 92 having an opening 94 and an upstanding projection or detent 96. Further details with respect to the construction and operation of the fastener F may be had by reference to the United States patent to R. A. Hartman et al. No. 2,672,905.

As best seen in FIGS. 1 and 3, the seat member 34 of the plunger means 30 provides a complementary shaped construction for seating a respective one of the fasteners in a generally vertically oriented relationship with respect to the longitudinal central axis of the body member 4 so as to maintain the column of fasteners in generally parallel relationship with respect to one another. Moreover, the body portion 80 is disposed in engagement with the inclined surface 56, the flared lip 90 is in engaged relation with the inclined surface 54 with the thread engaging edge 88 being disposed within the clearance area defined by the cut-out portion 60. Accordingly, the other body portion 82 extends generally in a vertical direction or perpendicular with respect to the general longitudinal axis of the body member 4 and hence, extends generally parallel to the corresponding parts of successive of the fasteners when in the installed position within the body member 4. For purposes of reference, the top of the cartridge device 2 contains the closed end of the fasteners while the bottom of the cartridge device contains the open end of the fasteners so that FIG. 1, for example, represents the cartridge device in an inverted position while FIG. 13 represents the device in the properly oriented installed position within the fastener driving tool T.

Figure 9:
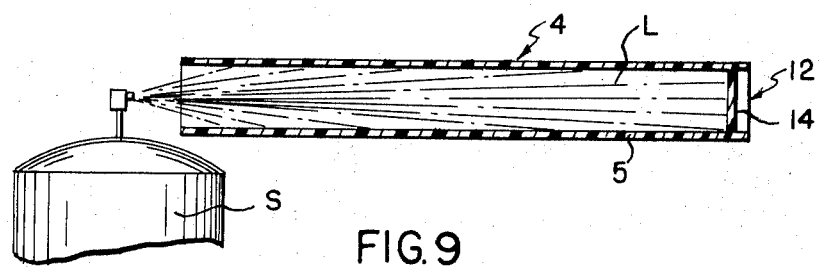
FIGS. 9 to 12 are generally schematic views showing a sequence of steps for making and filling the cartridge device of the present invention.
Figure 10:
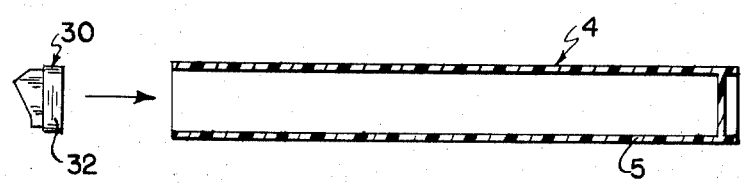
Figure 11:
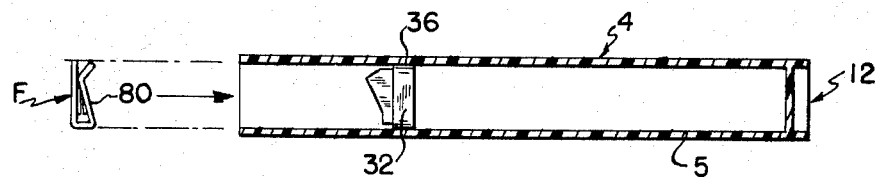
Figure 12:
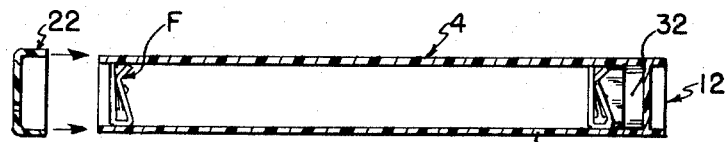

In FIGS. 9–12 there is schematically illustrated sequentially the steps for assembling the cartridge device 2 and for loading the same with the desired number of fasteners F therein. As shown in FIG. 9, the body member 4 may be treated by applying, such as by spraying or the like, a lubricant to the interior surface of the wall 5 to facilitate axial sliding movement of the fasteners F and/or the plunger means 30 therein. The lubricant may be supplied by a suitable spray device S, such as an aerosol sprayer so as to uniformly coat the interior of the body member 4. Preferably, the lubricant has good parting or release characteristics and may be of a neutral color of the non-silicone type.

Upon application of a suitable lubricant to the body member 4, the plunger means 30 may then be inserted into the body member 4 with the base 32 entering first. After the plunger means 30 is inserted, the fasteners F with the body portion 80 entering first (FIG. 11) are inserted so that the lead fastener is disposed in nested relation with respect to the angularly oriented confronting surface provided by the seat member 34 of the plunger means 30. After the desired number of fasteners have been inserted into the body member 4 so as to substantially fill the same, the removable cap means 22 (FIG. 12) may then be quickly disposed over the open end of the body member 4 to provide the final assembled cartridge device, as best seen in FIG. 1.

Figure 14:
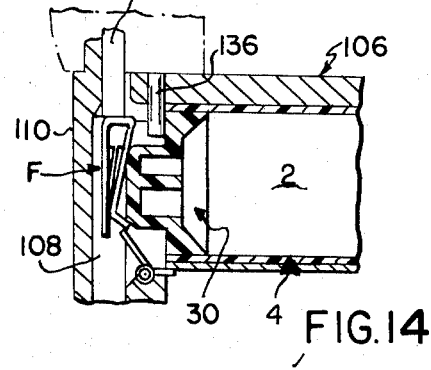
FIG. 14 is a fragmentary section view illustrating the position of the plunger member at the forward end of the cartridge device for discharge of a fastener into the ram guide of the fastener driving apparatus of FIG. 13.

In FIG. 13 there is illustrated a preferred form of a fastener driving tool T with which the cartridge device 2 of the present invention may be advantageously employed. In general, the tool T comprises a housing 100 made of a light weight material, such as aluminum or the like, and which contains a pneumatic actuating mechanism 102 for actuating a reciprocating fastener driving member 104. A magazine assembly 106 detachably mounts the cartridge device 2 of the present invention on the housing 100 so that the fasteners F contained therein may be fed into the ram guide 108 (FIG. 14) of a nose piece 110 depending from the housing 100 where they are driven by the driving member 104 upon actuation of a trigger mechanism 112.

In general, the housing 100 includes a rearwardly extending hollow handle portion 114 which provides a chamber or reservoir 116 for containing a volume of compressed air introduced into the tool through a suitable fitting 118 adapted to be connected to a source (not shown) of compressed air. The handle portion 114 is provided with an upper passageway 120 for returning exhaust air to the atmosphere upon actuation of the trigger mechanism 112.

The rear end of the handle portion 114 is provided with an integrally formed, downwardly extending leg 122 which may be connected to the rear end of the magazine assembly 106. The leg 122 is provided with a downwardly extending passageway 124 which communicates with a fluid chamber 125 within the magazine assembly 106 for delivering compressed air to a resiliently biased clamping mechanism 126. The clamping mechanism 126 is disposed for resilient movement adjacent the rear end of the magazine assembly 106 and generally includes a downwardly and inwardly extending passageway 128 which communicates with an aperture 130 provided in a resilient foot pad 132 which is adapted to be resiliently clamped against the confronting marginal edge of the flange 16 provided on the closure means 12 in the installed position of the cartridge device 2 with the magazine assembly 106 of the tool. By this arrangement, the aperture 130 in the resilient foot pad 132 is disposed for communication with the aperture 18 provided in the closure means 12 of the cartridge device 2 so that compressed air can be delivered through the respective apertures into the plunger means 30 for feeding the fasteners generally axially of the body member 4 and into the ram guide 108 of the nose piece 110 so that they may be driven by the driving member 104 (FIG.

14) downwardly through the ram guide 108 into an installed position with the support panel P upon selective actuation of the trigger mechanism 112, as aforesaid. For a more detailed description of the construction and operation of the driving tool T in conjunction with the cartridge device 2, reference may be had to the co-pending application to Albert T. Buttriss Ser. No. 76,743, filed Sept. 30, 1970.

To load the cartridge device 2 containing the fasteners F, the tool T is preferably held in a vertical position with the nose piece 110 up. A handle 134 made integral with the clamping mechanism 126 may then be simply pulled down and rotated one quarter turn to the right or left which acts to cut-off the supply of air to the foot pad 132. The cap means 22 may then be removed from a filled cartridge device 2 so that the device may then be inserted open end first into the magazine assembly 106, whereupon, the handle 134 may then be rotated to its original position and released so that the resilient foot pad 132 is drawn into resilient biased engagement with the confronting edge of the flange 16 of the closure means 12, thereby to provide an effective air seal between the resilient foot pad 132 and the closure means 12. Thus loaded, air is now free to enter the magazine assembly 106 through the aperture 130 in the resilient foot pad 132, through the associated aperture 18 in the closure means 12, through the opening 42 in the plunger means 30, and into the cavities 64 and 66 in the seat member 34 so that the resilient flange 36 of the base is deformed outwardly against the confronting interior surface of the body member 4 so as to provide an additional air seal. As the pressure builds behind the plunger means 30, it is forced generally axially of the body member 4 in a direction toward the nose piece 110 so as to deliver the fasteners F into the ram guide 108 for application to the support panel P in response to driving movement of the driving member 104 upon actuation of the trigger mechanism 112. In this regard, it is important that the fasteners F are driven from the gun with the open-end first. To this end, the nose piece 110 (FIG. 14) is provided with a projection 136 in the form of a dowel pin or the like which prevents the user from ejecting fasteners from the tool with the closed or U-bend end of the fastener facing the edge of the support panel P. The projection 136 extends downwardly adjacent the forward end 6 of the body member 4 when in the loaded position thereof and by an amount sufficient so as to extend into a clearance area provided by the cut-out portions 87 (FIG. 6) in the U-bend portions of the respective fasteners F. Accordingly, fasteners improperly positioned via the cartridge device 2 will be retained by the projection 136 since the body portion 82 of the fasteners will abut against the projection 136 in the wrongly inverted position of the cartridge device 2. Moreover, the slot 62 provided in the seat member 34 of the plunger means 30 acts to receive the projection 136 which enables the plunger means 30 to effectively travel the full length of the body member 4 and hence, enables the last remaining fastener to be moved into the ram guide 108 for ejection from the tool T, whereupon, the used cartridge device may be quickly and easily removed and another filled cartridge device inserted into the magazine assembly 106 for further operation upon simple actuation of the handle 134, as aforesaid.

What is claimed is:

1. A cartridge device for mounting a plurality of fasteners comprising:
   an elongated, hollow body member adapted to receive a plurality of fasteners therein;
   said body member including a forward end and a rearward end;
   plunger means disposed interiorly of said body member adjacent said rearward end adapted for sliding movement interiorly of said body member;
   said closure means having aperture means adapted to receive fluid under pressure therethrough for moving said plunger means interiorly of said body member thereby to discharge fasteners from the forward end of said body members;
   said closure means comprising a closure member joined in fluid sealing relation around its periphery to said body member;
   said closure member being offset inwardly of the rearward end of said body member, and
   said closure member defining with the outer marginal edge of said rearward end a recessed seat portion adapted for fluid sealing coaction with a portion of a fastener driving apparatus.

2. A cartridge device in accordance with claim 1, including
   cap means removably mounted adjacent the forward end of said body member adapted to prevent removal of fasteners from said body member in the inactive condition of said device.

3. A cartridge device for mounting a plurality of fasteners comprising:
   an elongated, hollow body member adapted to receive a plurality of fasteners therein;
   said body member including a forward end and a rearward end;
   plunger means disposed interiorly of said body member adjacent said rearward end adapted for sliding movement interiorly of said body member,
   closure means disposed over the rearward end of said body member,
   said closure means having aperture means adapted to receive fluid under pressure therethrough for moving said plunger means interiorly of said body member thereby to discharge fasteners from the forward end of said body member;
   said plunger means having a plug-like body having a base and a support-like seat member extending outwardly from said base adapted for coacting supporting engagement with an adjacent one of said fasteners;
   said base having an endless resilient skirt-like flange portion adapted for coacting fluid sealing and sliding engagement with the confronting interior surface of said body member, and
   said flange portion being defined by a resilient endless wall adapted to be biased outwardly into coacting fluid sealing engagement with the confronting interior surface of said body member upon delivery of fluid under pressure through said aperture means.

4. A cartridge device in accordance with claim 3 wherein
   said wall is of a polygonal configuration, in end elevation, including end and side wall portions, and
   said end and side wall portions being inclined inwardly and outwardly in a direction toward said seat member.

5. A cartridge device for mounting a plurality of fasteners comprising:
   an elongated, hollow body member adapted to receive a plurality of fasteners therein;
   said body member including a forward end and a rearward end;
   plunger means disposed interiorly of said body member adjacent said rearward end adapted for sliding movement interiorly of said body member,
   closure means disposed over the rearward end of said body member;
   said closure means having aperture means adapted to receive fluid under pressure therethrough for moving said plunger means interiorly of said body member thereby to discharge fasteners from the forward end of said body member;
   said plunger means having a plug-like body having a base and a support-like seat member extending outwardly from said base adapted for coacting supporting engagement with an adjacent one of said fasteners;
   said base having a resilient endless flange portion adapted for coacting sliding engagement with the confronting interior surface of said body member, and said flange portion defining an opening communicating with the exterior of said plug-like body.

6. A cartridge device in accordance with claim 5, wherein said seat member includes a recessed cavity portion communicating with the opening defined by said flange portion.

7. A cartridge device in accordance with claim 6, including a web portion extending transversely of said cavity portion adapted for strengthening said flange portion.

8. A cartridge device in accordance with claim 5, wherein said seat member is of a polygonal configuration having dimensions less than the corresponding dimensions of the cross-sectional shape of said body member.

9. A cartridge device for mounting a plurality of fasteners comprising:

an elongated, hollow body member adapted to receive a plurality of fasteners therein;

said body member including a forward end and a rearward end;

plunger means disposed interiorly of said body member adjacent said rearward end adapted for sliding movement interiorly of said body member;

closure means disposed over the rearward end of said body member;

said closure means having aperture means adapted to receive fluid under pressure therethrough for moving said plunger means interiorly of said body member thereby to discharge fasteners from the forward end of said body member;

said plunger means having a plug-like body having a base and a support-like seat member extending outwardly from said base adapted for coacting supporting engagement with an adjacent one of said fasteners;

said seat member having an outer support surface shaped generally complementary to the confronting surface of an adjacent one of said fasteners, and the outer support surface of said seat member includes a cut-out means adapted to receive a projecting portion of a fastener driving apparatus to prevent discharge of fasteners from said body member when in an inverted installed position thereof.

10. A cartridge device in accordance with claim 3, wherein said body member is made from a flexible polymeric material.

11. A cartridge device in accordance with claim 10, wherein said material is generally transparent.

12. In combination, an elongated, hollow member, and a plurality of fasteners disposed in side-by-side relation within said body member, said body member including:

a forward end and a rearward end, a plunger means disposed interiorly of said body member between the rearward-most of said fasteners and the rearward end of said body member and adapted for sliding movement in a lengthwise direction interiorly of said body member, closure means disposed over the rearward end of said body member, said closure means having aperture means adapted to receive fluid under pressure therethrough for moving said plunger means in a direction from said rearward end toward said forward end, thereby to discharge said fasteners from the forward end of said body member, said plunger means includes a plug-like body having a base and a support-like seat member extending outwardly from said base shaped generally complementary to the confronting surface of an adjacent one of said fasteners for coacting supporting engagement with the adjacent one of said fasteners, said base includes a resilient endless flange portion adapted for coacting fluid sealing and sliding engagement with the confronting interior surface of said body member, and said flange portion defining an opening communicating with the exterior of said plug-like body.

References Cited

UNITED STATES PATENTS 3,429,431   2/1969   Macondray et al. __ 206—56 AC
3,478,405   11/1969  Brown et al. _____ 29—212

JAMES C. MITCHELL, Primary Examiner

U.S. Cl. X.R.

206—56 AC; 29—212